(12) United States Patent
Notea

(10) Patent No.: US 8,301,472 B2
(45) Date of Patent: Oct. 30, 2012

(54) SYSTEM AND METHOD FOR CATEGORIZING ACTIVITIES IN COMPUTER-ACCESSIBLE ENVIRONMENTS

(75) Inventor: Amir Notea, Kfar Neter (IL)

(73) Assignee: Timest Ltd, Jerusalem (IL)

( * ) Notice: Subject to any disclaimer, the term of this patent is extended or adjusted under 35 U.S.C. 154(b) by 1394 days.

(21) Appl. No.: 11/883,844

(22) PCT Filed: Feb. 8, 2006

(86) PCT No.: PCT/IL2006/000164
§ 371 (c)(1),
(2), (4) Date: Aug. 7, 2007

(87) PCT Pub. No.: WO2006/085315
PCT Pub. Date: Aug. 17, 2006

(65) Prior Publication Data
US 2008/0126158 A1    May 29, 2008

Related U.S. Application Data

(60) Provisional application No. 60/651,805, filed on Feb. 8, 2005.

(51) Int. Cl.
*G06Q 10/10* (2006.01)
(52) U.S. Cl. .................................................... 705/7.11
(58) Field of Classification Search ................. 705/7.11
See application file for complete search history.

(56) References Cited

U.S. PATENT DOCUMENTS

| 5,506,955 | A | 4/1996 | Chen et al. | |
|---|---|---|---|---|
| 5,684,945 | A | 11/1997 | Chen et al. | |
| 5,903,730 | A * | 5/1999 | Asai et al. | 709/224 |
| 5,938,729 | A * | 8/1999 | Cote et al. | 709/224 |
| 6,356,917 | B1 * | 3/2002 | Dempsey et al. | 1/1 |
| 6,445,774 | B1 * | 9/2002 | Kidder et al. | 379/9.03 |
| 6,513,060 | B1 * | 1/2003 | Nixon et al. | 709/203 |
| 6,901,582 | B1 * | 5/2005 | Harrison | 717/127 |
| 7,504,082 | B2 * | 3/2009 | Cho et al. | 423/263 |
| 7,987,108 | B2 * | 7/2011 | Wetzer et al. | 705/7.12 |

OTHER PUBLICATIONS

International Search Report—Jan. 2, 2007.

* cited by examiner

*Primary Examiner* — Romain Jeanty
(74) *Attorney, Agent, or Firm* — Pearl Cohen Zedek Latzer, LLP

(57) ABSTRACT

The invention discloses a system and method for collecting over time significant amounts of low-level data about automated devices used by the users, and for analyzing these data over time in order to achieve insight into what improves the users' ability to perform their activity and what hinders their performance. Such analysis may relate to a single user, to a group of users, to the effect of a user's habits on his/her performance, to the effect of one user's actions on other users' performance, etc. The results of such analysis can help users, managers and organizations to improve their competitive position in their respective fields.

9 Claims, 10 Drawing Sheets

SYSTEM AND METHOD FOR CATEGORIZING ACTIVITIES IN COMPUTER-ACCESSIBLE ENVIRONMENTS

CROSS-REFERENCE TO RELATED APPLICATIONS

This application is a National Phase Application of PCT International Application No. PCT/IL2006/000164, International Filing Date Feb. 8, 2006, claiming priority of U.S. Provisional Patent Application 60/651,805, filed Feb. 8, 2005.

FIELD OF THE INVENTION

The invention relates to monitoring computer-accessible environments, in general, and to a system for categorizing and analyzing user-related activities in a computer-accessible environment, in particular.

BACKGROUND OF THE INVENTION

In many modern organizations, the cost of Human Resources is a major expense, but this expense is often poorly measured, analyzed and managed. Automated devices—E.g., computers—are often used, but their performance-improvement potential is not maximized. Productivity bottlenecks are hidden, and improvement is possible mostly by intuition, rather than as a systematic effort.

In many modern organizations, people work a large portion of the time with computers. The modern computer is capable of performing many types of tasks, and the person using the computer performs many different tasks with the computer. Such tasks may include accounting, scientific research, engineering, artistic design, documentation, customer support, marketing, publishing and the like. In addition to the profusion of different tasks, workers often perform several similar tasks, such as preparing printed materials for three different customers in the same day. For a worker or business manager, the question rises of how the cost of each task can be determined. This information must be established, so that the customer can be correctly charged, and so that the business does not lose money.

Financial considerations are further complicated by additional factors that may cause productivity bottlenecks: Computer software and hardware cost money; Poorly selected, configured or used software and hardware may impede work; Insufficient employee training may cause waste of resources; insufficient human, hardware and software resources allocation leads to time wasted by the users. Conversely, excessive human, hardware and software resources allocation leads to waste and negatively impacts competitiveness. Computers and users interact with each other, sharing resources, and therefore may interfere with each other's progress; and any other operational factor that affects the users' work. Indirect factors relating to computers and their users also affect the organization's performance: Intentional or non-intentional breaches of security through the use of computers; Conscious or unconscious breaches of license contracts with vendors; etc.

One currently available method for determining the cost of a task is intuitive estimation by either the worker or the manager. This method is, by definition, very inaccurate. Overestimation will cause the price to be too high, causing the business to lose competitiveness. Underestimation will cause the price to be too low, causing the business to lose money on tasks performed. Emphasis on the wrong cost factors will prevent taking the right action to improve the organization's competitiveness.

Another method is to oblige the employee to write down exactly what tasks he/she performs. This method interferes with the job of the worker, creating an extra cost and again diminishing competitiveness of the business. Switching often between tasks, aggravates the interference, and increases the likelihood that the employee will revert to intuitive estimation.

U.S. Pat. No. 5,684,945 to Chen et al, entitled "System and method for maintaining performance data in data processing system", is directed to a performance monitor that detects pathological states of a monitored system. The performance monitor defines a library of known pathologies, which are expressed by the values the performance monitor can measure. The performance monitor captures and statistically analyzes its inputs, and then compares these inputs to measurements statistics in a known-problem library. When a match is found, the performance monitor may generate a suitable notification. The performance monitor is also capable of recording and playing-back events that show a defective state of the monitored system, for example for re-creating the situation for later examination.

U.S. Pat. No. 5,506,955 to Chen et al, entitled "System and method for monitoring and optimizing performance in a data processing system", is directed to a system for incrementally filtering and analyzing incoming data, with generating alarms and automatic on-line optimization actions on tracked processes and systems as a result of the real-time analysis. The system concentrates on the handling of alarms, and the different ways the alarms affect external entities. The system is based on mathematical expressions used to manipulate the measured data. The system also keeps the intermediate results of its calculations, to allow other programs to use these results.

It is therefore advantageous to collect over time significant amounts of low-level data about automated devices used by the users, and analyze these data over time to achieve insight into what improves the users' ability to perform their jobs and what hinders their performance. Such analysis may relate to a single user, to a group of users, to the effect of a user's habits on his/her performance, to the effect of one user's actions on other users' performance, etc. The results of such analysis can help users, managers and organizations to improve their competitive position in their respective fields.

SUMMARY OF THE INVENTION

In accordance with the invention, there is thus provided a system that may collect activity data continuously from a target Monitored Environment, where a 'Monitored Environment' is any system capable of reporting its activity passively or actively. The activity data may include the state, changes in state and interactions of substantially all logical entities in the computer, such as computer resources, communication resources, storage resources, operating system, applications, windows, user activities, and the like. The invention may amend measured activities by pattern recognition, heuristics and/or data-mining and may check against categories of activities, allowing the generation of reports describing the activities in high-level terms of tasks, rather than low-level terms of windows and applications. The invention also compares and correlates measurements from different computers, to detect and report activities in higher-levels, such as group tasks, group interactions, compound effects of activities in a group, and event impact analysis across a group of computers and users. The activity data may also include a time-context (i.e., the exact time the activity occurred). The invention also addresses related issues of personal privacy, organizational security and communication lines limitations.

BRIEF DESCRIPTION OF THE DRAWINGS

The invention will be understood and appreciated more fully from the following detailed description taken in conjunction with the drawings in which.

Figure 1:
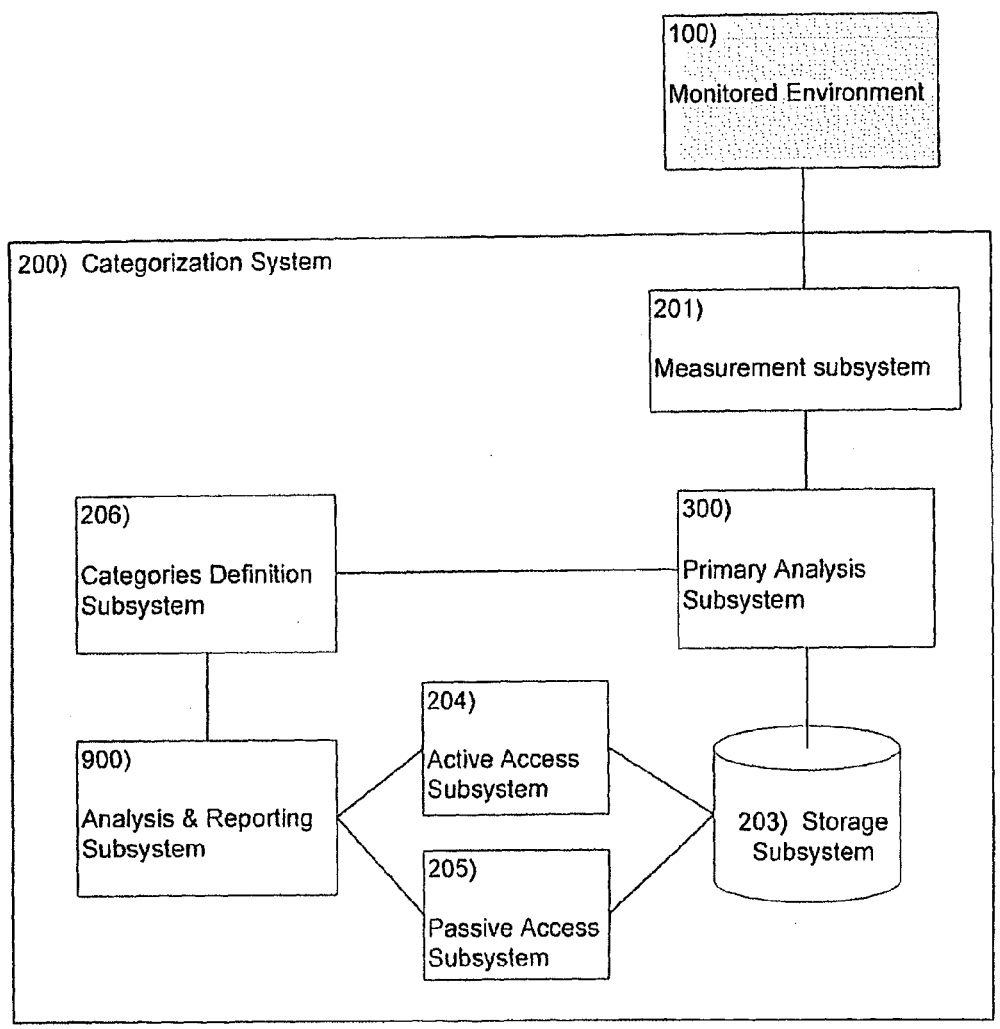
FIG. 1 is a schematic illustration of a categorization system, constructed and operative in accordance with an embodiment of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS OF THE INVENTION

The invention overcomes the disadvantages of the prior art by providing a system for categorizing activities in a monitored environment, where the categories can include multiple applications or parts of a single application, thereby allowing the activities to be described in terms of high-level tasks. The invention may also solve problems related to privacy and security, stemming from a large amount of raw and analyzed information being collected. The invention may also solve problems related to limited communication-line capacity, which in prior art causes the collection of insufficient data.

In accordance with the invention, an analysis system can collect data from hardware, software, and operating-system resources, whether they interact with the user or not. The analysis system may pre-analyze the data, and may store or forward the data for statistical post-analysis. Analysis may be performed on either a single computer, or across multiple computers. The analysis system may deal with activities over time, rather than just processes or transactions. The analysis system may be conceptually simple, and may concentrate on collection and statistical analysis of data regarding activities, without presenting a macroscopic model for the business-process that invoked these activities. The analysis system may be mostly concerned with post-analysis, not real-time analysis. The analysis system may detect and statistically analyze normal usage time and patterns, and may provide means for further analysis. The analysis system may collect data over a period of time, rather than incrementally, after which an offline statistical analysis may be created, to be used by a personal (i.e., non-automated) reviewer. Enough raw information may be retained by the system to allow re-analysis of old data in view of newer data, and using new algorithms. The analysis system does not necessarily concentrate on managing IT resources' performance, and may concentrate on managing Human performance.

Figure 2:
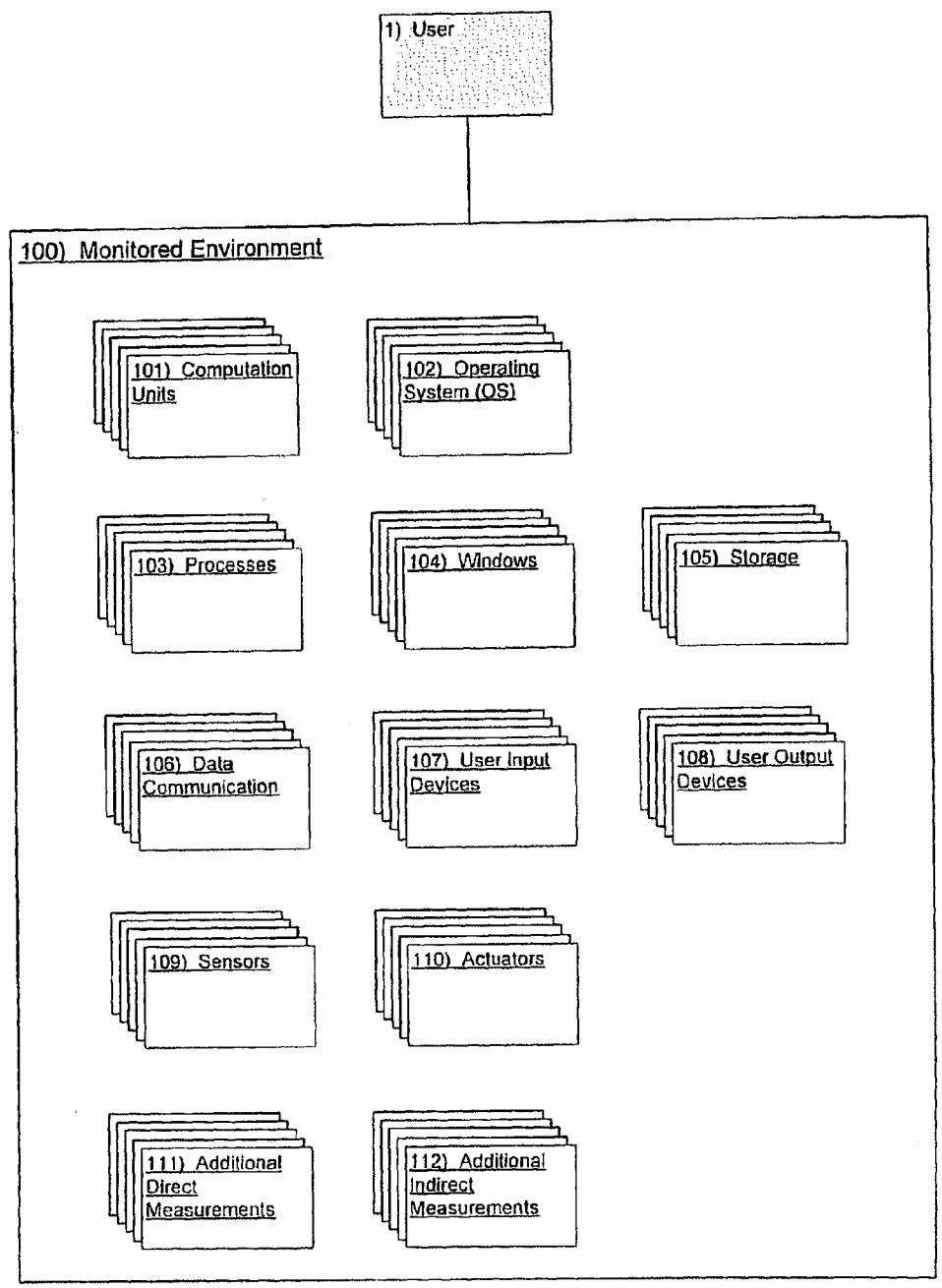
FIG. 2 is a schematic illustration of the Monitored Environment, in relation to which the categorization system of FIG. 1 operates.

In the general case of a Categorization System 200 of FIG. 1, any number of instances of Monitored Environment 100 of FIG. 2 may be monitored, analyzed and/or reported upon. Any of the Subsystems described in reference to FIGS. 1-10 may relate to any number of instances of Monitored Environment 100 of FIG. 2.

Functionalities of certain subsystems may be moved to other subsystems. Some, but not all, examples of such options are explicitly mentioned below.

Reference is now made to FIG. 1, which is a schematic illustration of a categorization system, generally referenced 200, constructed and operative in accordance with an embodiment of the invention. Monitored Environment 100 is elaborated upon with reference to FIG. 2.

Categorization System 200 includes a Measurement Subsystem 201, a Primary Analysis Subsystem 300, a Storage Subsystem 203, an Active Access Subsystem 204, a Passive Access Subsystem 205, a Categories Definition Subsystem 206, and an analysis and Reporting Subsystem 900. Measurement Subsystem 201 may be coupled with any and all of the components of the Monitored Environment, which are illustrated in FIG. 2. Primary Analysis Subsystem 300 may be coupled with Measurement Subsystem 201, with Storage Subsystem 203, and with Categories Definition Subsystem 206. Storage Subsystem 203 may be further coupled with Active Access Subsystem 204, and with Passive Access Subsystem 205. Analysis and Reporting Subsystem 900 may be coupled with Active Access Subsystem 204, with Passive Access Subsystem 205, and with Categories Definition Subsystem 206.

In one embodiment of the invention, all subsystems of Categorization System 200 are implemented in software. Alternatively, any subsystem of Categorization System 200 may be implemented, in whole or in part, in hardware.

The subsystems of Categorization System 200 may all reside on a single computer, which may be the same or different than Monitored Environment 100. Alternatively, each of the subsystems of Categorization System 200 may reside on a different device. Any single subsystem of Categorization System 200 may reside on a single computer or device, or it may be divided among two or more computers and/or different devices. Any component of Categorization System 200 may use resources of the Monitored Environment 100, for example, Storage Subsystem 203 may use Storage 105 with reference to FIG. 2. Data stored in any of the subsystems or data passed from one subsystem to another subsystem may be encrypted, Different data may be encrypted differently. Data stored in any of the subsystems or data passed from one subsystem to another subsystem may be digitally signed.

Any activity of a subsystem of Categorization System 200 may be performed according to a synchronous time schedule (e.g., every second, after another subsystem has completed an activity cycle, and the like). Alternatively, an activity of a subsystem may be performed according to an asynchronous event schedule (e.g., upon request, after a user presses a certain key on the keyboard, and the like). Further alternatively, an activity of a subsystem may be performed according to a combination of synchronous and asynchronous schedules.

Any subsystem of Categorization System 200 may handle data from a single computer (e.g., Monitored Environment 100), or from multiple Monitored Environments. Measurement Subsystem 201 may collect data from any component of Monitored Environment 100 of FIG. 2. See discussion of FIG. 2 for examples of data collected. Any component of Categorization System 200 may be activated repeatedly. Any component of Categorization System 200 may be activated at a different rate.

Primary Analysis Subsystem 300 may perform initial analysis of data. Pre-analysis subsystem 300 may also use a module like Pretransmit Data Conditioning Subsystem 1100 to reduce the amount of data in Storage Subsystem 203 and/or other component of Categorization System 200. Primary Analysis Subsystem 300 may prepare the data for subsequent analysis. Primary Analysis Subsystem 300 may pass the measured data without any modification to Storage Subsystem 203. Primary Analysis Subsystem 300 may add derived pieces of data to the measured data—See example in Analyzed Data Items 600, with reference to FIG. 3. Alternatively, Primary Analysis Subsystem 300 may perform much or all of the required analysis. Primary Analysis Subsystem 300 may be activated repeatedly, whenever new data is provided by Measurement Subsystem 201, or iteratively on the same data. Primary Analysis Subsystem 300 may collect two or more instances of measurements provided by Measurement Subsystem 201, and pre-analyze these measurements together. Primary Analysis Subsystem 300 may use past analysis and re-analysis to alter its analysis. In some embodiments of the invention, Primary Analysis Subsystem 300 includes recognition of patterns (e.g., a keyboard sequence appearing cyclically, potentially indicating automated activation). Primary Analysis Subsystem 300 may further perform aggregation of measurements, according to Categories Definition Subsystem 206.

Storage Subsystem 203 holds the measured data after the optional pre-analysis, to be accessed by analysis and Reporting Subsystem 900. Storage Subsystem 203 may passively allow Primary Analysis Subsystem 300 and Active Access Subsystem 204 to read, write, change, and/or delete data. In some embodiments, Storage Subsystem 203 may not store data, but may just forward the data from Primary Analysis Subsystem 300 to Analysis & Reporting Subsystem 900 through Active Access Subsystem 204 and/or Passive Access Subsystem 205.

Active Access Subsystem 204 actively sends data from Storage Subsystem 203 to Analysis and Reporting Subsystem 900. The data may be sent using Simple Mail Transfer Protocol (SMTP), File Transfer Protocol (FTP), inter-process communication, and the like. Optionally, Categorization System 200 does not include Active Access Subsystem 204, and only includes Passive Access Subsystem 205.

Passive access subsystem 205 allows Analysis & Reporting Subsystem 900 to access, and optionally to manipulate, data in Storage Subsystem 203. The data may be accessed using FTP, inter-process communication, Network File System (NFS), and the like. Analysis & Reporting Subsystem 900 may use Passive Access Subsystem 205 to access Storage Subsystem 203 directly. Optionally, Categorization System 200 does not include Passive Access Subsystem 205, and only includes Active Access Subsystem 204.

Categories definition subsystem 206 allows Primary Analysis Subsystem 300 and/or analysis and Reporting Subsystem 900 to categorize activities into groups. For example, a group of activities in Microsoft Excel or in Microsoft Word may be aggregated into a new category, which may be named "Microsoft Office". A user may manually enter categories definitions. Primary Analysis Subsystem 300 and/or Analysis & Reporting Subsystem 900 may each change data in Categories Definition Subsystem 206, For example, by registering applications that tend to be active at the same time. Categories definition subsystem 206 may use an instance of General Subsystem-Configuration Subsystem 1000 of FIG. 4, to hold and manage the definitions of categories. Categories definitions may be implemented as a simple table In a simple embodiment, each line of such table may contain the name of a category and the name of an executable associated with a process measured by Processes 103 of FIG. 2, for example:

| | |
|---|---|
| MS_OFFICE | EXCEL.EXE |
| MS_OFFICE | MSWORD.EXE |
| MS_OFFICE | POWERPNT.EXE |
| ACCOUNTING | EXCEL.EXE |
| ACCOUNTING | CALC.EXE |

Figure 8:
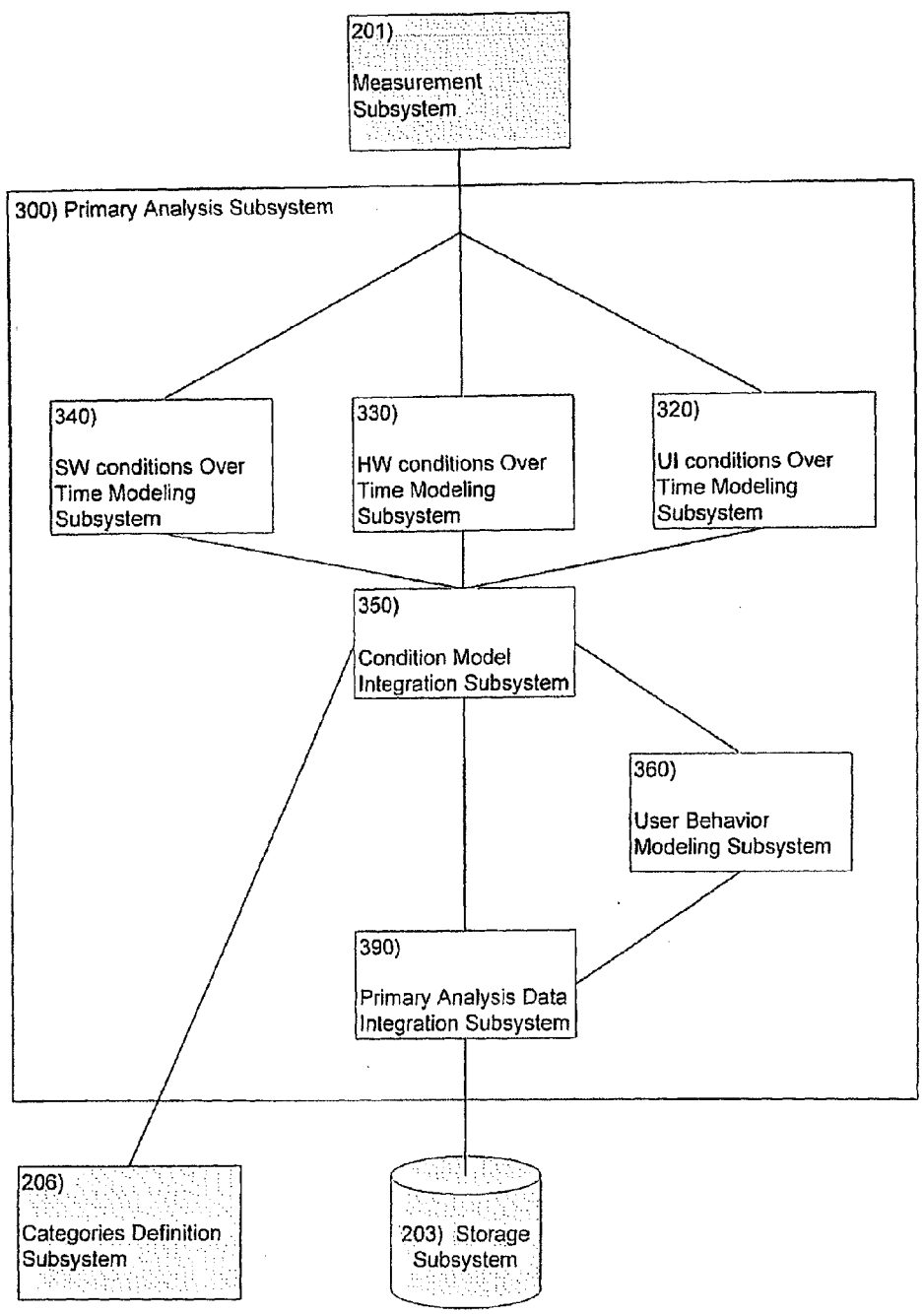
FIG. 8 is a schematic illustration of Primary Analysis Subsystem, which may be used to analyze raw data within categorization system of FIG. 1.

In this example, the left column is the "Category ID", and the right column is the "Source Item". Whenever either EXCEL.EXE, MSWORD.EXE or POWERPNT.EXE report being in a certain state—such as described in discussing SW Conditions Over Time Modeling Subsystem 340 of FIG. 8—such state may be associated with MS_OFFICE as well as with the individual executable, to provide higher level of association. A single "Source Item" may appear more than once, a single "Category ID" may appear more than once. Any "Category ID" may be used as a "Source Item", creating a tree of definitions. "Source Item" may be any value measurable by Measurement Subsystem 201 of FIG. 1. "Source Item" may be any value derived by Primary Analysis Subsystem 300 of FIG. 8. "Source Item" may be any value derived by High-Level Analysis Subsystem 500 of FIG. 9. "Source Item" may be any value imported by Imported External Entity Representation Module 430 of FIG. 10. "Source Item" may be any value generated by any combination such as described in FIG. 3. "Source Item" may be any value generated by any other module or subsystem described in this invention. "Source Item" may be any combination of "Source Item"s, for example, opening a specific window measured from Windows 104 of FIG. 2 associated specifically with a specific process measured from Processes 103 of FIG. 2. Accordingly, if Categories Definition Subsystem 206 uses a table, the table may contain any number of columns, to account for combinations of "Source Item"s. Categories Definition Subsystem 206 may use simple or complex logical combinations of states and activities used as "Source Item"s;

For example, "Category ID" SINGLE_UI_ACTIVE may be associated with a situation where one and only one application reports "UI-Used" through UI Conditions Over Time Modeling Subsystem 320 of FIG. 8. Categories Definition Subsystem 206 may use any data structure or mechanism known in the art for keeping categories definition, in addition to or instead of tables such as the one described in the example above.

Analysis & Reporting Subsystem 900 completes the analysis of the data in Storage Subsystem 203, and presents reports describing the data. Analysis & Reporting Subsystem 900 may be implemented using existing tools, such as Oracle. Alternatively, Analysis & Reporting Subsystem 900 may be implemented, in whole or in part, specifically for Categorization System 200. Analysis & Reporting Subsystem 900 may use additional data, which is not generated by Categorization System 200. Analysis and Reporting Subsystem 900 may receive data for analysis and reporting from multiple computers. Analysis & Reporting Subsystem 900 may contain its own storage data, allowing retention and management of old data for future re-analysis and comparisons. Analysis & Reporting Subsystem 900 may be activated upon user demand. Analysis & Reporting Subsystem 900 may include recognition of patterns within a single Monitored Environment 100 or between different instances of Monitored Environment 100. For example, in an environment containing ten computers marked 100.1 to 100.10: the user of computer 100.10 stops working, after computers 100.1-100.9 activated a certain application, potentially indicating a "floating license" could not be obtained by computer 100.10 since all the available licenses are being used by computers 100.1-100.9). Analysis & Reporting Subsystem 900 may include aggregation of measurements according to Categories Definition Subsystem 206.

Reference is now made to FIG. 2, which is a schematic illustration of a Monitored Environment, generally referenced 100, in which the categorization system of FIG. 1 operates. User 1 may be a human using a computer as a primary tool for activity or as a supplementary tool. User 1 may even not be actively using Monitored Environment 100, but passively being monitored by it. User 1 may be an individual or a group, User 1 may be human, animal or any other entity that may be monitored directly or indirectly by Monitored Environment 100.

Monitored Environment 100 is a source for measured data, which provides direct information about automatic devices, and indirect information about Users. Monitored Environment 100 may include one or more of the following components: Computation Units 101, Operating System (OS) 102, Processes 103, Windows 104, Storage 105, Data Communication 106, User Input Devices 107, User Output Devices 108, Sensors 109, Actuators 110, Additional Direct Measurements 111 and Additional Indirect Measurements 112.

Monitored Environment 100 may be any multi-purpose computing system, that can harbor at any given time one or more software applications, and use one or more hardware extensions (e.g., an International Business Machines Personal Computer (IBM PC)). Alternatively, Monitored Environment 100 may be any dedicated system capable of reporting data and/or activity to the outside, either actively or passively, such as a telephone exchange, a security system, and the like. The term "activity" herein refers to any activity in one or more of the logical or physical components of Monitored Environment 100, any interaction among the logical or physical components of Monitored Environment 100, and any interaction between the logical or physical components of Monitored Environment 100 and an entity external to Monitored Environment 100. Any change in the state of any component of Monitored Environment 100 is also considered an "activity". Any data generated by, corning into, sensed or intercepted by a component of Monitored Environment 100 is also considered an "activity". Patterns of activities are also considered to be an "activity". Any component of Monitored Environment 100 may be divided into subcomponents, for the purpose of considering lower level "activity" (e.g., activity of the floating point unit (FPU) within a CPU). Any group of two or more components of Monitored Environment 100 may be aggregated into a single component, for the purpose of considering higher level "activity". Categorization System 200, with reference to FIG. 1, may measure any and all activities in the Monitored Environment 100.

Computation Units 101 may be any combination of components of Monitored Environment 100 with the ability to process data. For example, Computation Units 101 may be a single central processing unit (CPU), a group of similar or different CPUs, a digital processing unit (DSP), a computing unit on the display controller of Monitored Environment 100, and the like. Computation Units 101 may be divided among any number of Processes 103. Data collected from Computation Units 101 may include percentage of CPU utilization at a given period of time, types of instructions executed over a given period of time, processor exceptions such as memory page faults, the processor state at any given time, such as "idle", and like data. OS 102 may be any software or hardware designed to manage the computing resources of Monitored Environment 100, and allow software applications to run and use these computing resources. OS 102 may be a single OS or multiple OSs working in the same environment or in several environments, which are analyzed by Categorization System 200. OS 102 may provide access to information used by Categorization System 200 (e.g., running applications and the resources used by the applications). OS 102 may include different parts, each of which are provided by different vendors (e.g., a basic input/output system (BIOS) by IBM, Windows XP by Microsoft, and the like). OS 102 may manage some or all of the computing resources of Monitored Environment 100. OS 102 may provide additional logical resources, such as virtual memory (i.e., part of Storage 105), threads, data files, data streams, and the like. Data collected from OS 102 may include number and types of running threads, number and types of allocated operating-system resources such as semaphores, events such as timeouts while waiting for resources, the user-name of currently logged-in user, and like data.

Processes 103 are the part of a software application that uses memory, computation power, and other resources of Monitored Environment 100. Some of the Processes 103 may interact with the User 1 (e.g., Microsoft Excel). Some of the Processes 103 may be internal to activities not directly related to the User 1 (e.g., Microsoft Windows "Services"). Each of the Processes 103 may contain one or more execution threads. Each of the Processes 103 may use computing resources, such as Computation Unit 101, internal resources of OS 102, and the like. Each of the Processes 103 may share resources with other Processes 103. Data collected from Processes 103 may include the number and types of running processes, the amount of CPU power consumed by each process at a given period of time, number and types of resources connected with each process, such as communication resources, dependencies between processes, and like data.

Windows 104 are user-interface objects that may be of interest to the User 1, or indicate the activity of the User 1. Examples of Windows 104 are: a graphical user interface (GUI) window (e.g., the rectangular object containing the text of a document being viewed by Microsoft Word in Microsoft Windows), a GUI edit-box or menu, an X-Windows server or client, as in UNIX systems, a console window, as in mainframe computer systems), and the like. Activities of one of Windows 104 may include: opening, closing, placing in the background or foreground, and the like. The state (i.e. attributes) of one of Windows 104 may include: content, size, location, and the like. Data collected from Windows 104 may include any window activity, any window state, and like data.

Storage 105 may be any component of Monitored Environment 100 that can store data temporarily or permanently. Examples of Storage 105 are: physical Random-Access-Memory (RAM), Memory cache, a hard disk, removable memory media, virtual memory, and the like. Activities of Storage 105 may include: amounts of used memory, changes in amounts of used memory, interactions between different parts of Storage 105, and the like. Data collected from Storage 105 may include any activity. Data Communication 106 may be any component of Monitored Environment 100 that can communicate between the internal parts of Monitored Environment 100 and the external world, where the terms "internal" and "external" may be used either logically or physically. Examples of data communication 106 are: a local area network (LAN), a recommended standard-232C (RS232) interface, PC parallel ports, busses, and the like. 'Data' as used in Data communication 106 may relate to voice date, video data, any other data collected by a sensor or sensors, and/or to any other data. 'Data' in Data communication 106 may also include any information not directed to or from Monitored Environment 100, but sensed or intercepted by Data communication 106. 'Data' in Data communication 106 may also include information communicated between different parts of Monitored Environment 100. Data collected from Data Communication 106 may include number and types of communication resource allocation, such as opening a serial port. Data collected from Data Communication 106 may also include specific data transmitted and/or received over communication resources, statistics about such transmission and/or reception, communication resource events such as errors, communication resource states, such as "idle", and like data.

User Input Devices 107 may be any component of Monitored Environment 100 that can receive input from a user. User Input Devices 107 may report its internal state, and/or the input itself, and all these data are considered part of User Input Devices 107. Examples of User Input Devices 107 are: a keyboard, a mouse, mouse movements, and the like. Data collected from User Input Devices 107 may include rate of typing on a keyboard in a given period of time, rate of moving a mouse, data typed using a keyboard, and like data. User Output Devices 108 may be any component of Monitored Environment 100 that can present information to a user. Examples of user output devices 108 are: a screen display, a sound system, and the like. Data collected from Output Devices 108 may include percentage of time the sound system is in use, refresh-rate of a display, the state of the display at a given moment such as "updating" or "static", the data presented on a display, and like data.

Sensors 109 may be any component of Monitored Environment 100 that can receive any information, which are neither Data Communication 106 nor User Input Devices 107. Examples of Sensors 109 are: a seismograph, a thermometer, and the like. Data collected from Sensors 109 may include room temperature at a given moment, noise level at a given moment, a video stream from a camera, and like data.

Actuators 110 may be any computing resource of Monitored Environment 100 that can cause an effect or transmission, which are neither Data Communication 106 nor User Output Devices 108. Examples of actuators 110 are: a robotic arm, automatically activated computer chassis fan, and the like. Data collected from Actuators 110 may include state and speed of computer chassis fan at a given moment in time, location in space of a robotic arm at a given moment in time, and like data.

All the components of Monitored Environment 100 that can be accessed by Measurement Subsystem 201 of Categorization System 200 for collecting data. All the components of Monitored Environment 100 are generally denoted as Monitored Environment, referenced 100 in FIG. 1.

Figure 3:
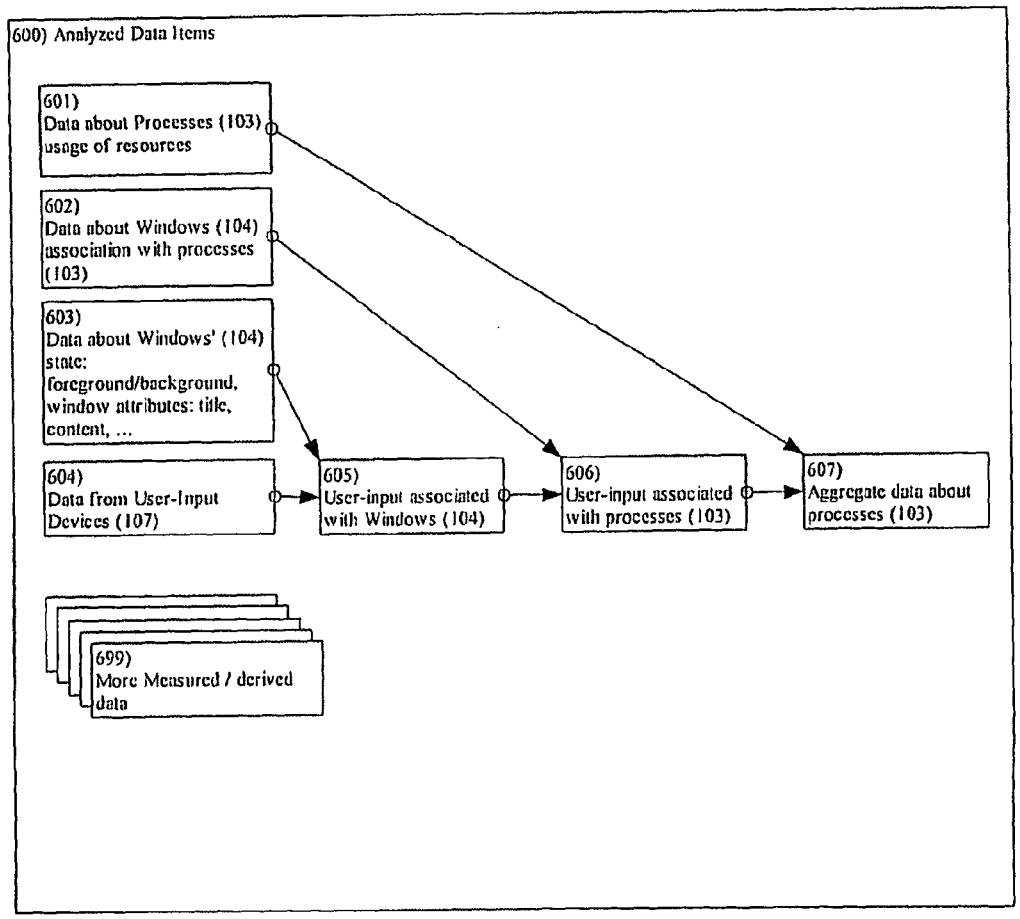
FIG. 3 is a schematic illustration of Analyzed Data Items, which are directly measured and indirectly derived by the categorization system of FIG. 1.

Reference is now made to FIG. 3, which is a schematic illustration of Analyzed Data Items, generally referenced 600, which are directly measured and indirectly derived by the Categorization System 200 of FIG. 1. FIG. 3 explicitly shows a few examples of how direct and indirect measurements may be combined to create new data. It can be appreciated that any and all of the components in Monitored Environment 100 of FIG. 2 may be used as direct measurements in Analyzed Data Items 600, and that innumerable combinations and recombinations may be used to generate indirect data. Analyzed Data Items 600 may include data about process usage of resources 601, data about windows association with processes 602, data about windows state 603, data from user input devices 604, user input associated with windows 605, user input associated with processes 606, aggregate data about processes 607, and more measured or derived data 699.

Analyzed Data Items 600 may include any and all the data items that Categorization System 200 of FIG. 1 collects, derives, tracks, and analyzes. The full set of Analyzed Data Items 600 may contain all the data that can be collected from all components of Monitored Environment 100 of FIG. 2. For example, the full set of Analyzed Data Items 600 may contain all the data that can be collected from Microsoft Windows XP Windows Management Instrumentation (WMI) services, or from any UNIX "top" or "ps" utilities. The full set of Analyzed Data Items 600 may also contain all the possible associations between any two or more data items of Analyzed Data Items 600 (e.g., user input associated with windows 605, user input associated with processes 606, aggregate data about processes 607).

Data about process usage of resources 601 may be obtained directly from components of Monitored Environment 100. For example, in Microsoft Windows XP, process usage of CPU resources may be obtained from WMI services.

Data about windows association with processes 602 may be obtained from OS 102. For example, in Microsoft Windows XP, data about windows association with processes 602 may be obtained using the EnumWindows( ) function, followed with, in the enumeration routine, using the GetWindowThreadProcessId( ) function with the windows handle provided to the enumeration routine.

Data about windows state 603 may be obtained from OS 102. For example, in Microsoft Windows XP, data about windows state 603 may be obtained using the GetForegroundWindow( ) function.

Data from user input devices 604 may be obtained from OS 102. For example, in Microsoft Windows XP, keyboard data may be obtained by using the SetWindowsHookEx( ) function to intercept all keyboard entries. Categorization system 200 may collect all user input data. Alternatively, Categorization System 200 may collect a mere indication of the fact that an input was entered, or any level of detail in between.

User input associated with windows 605 may be derived by combining data about windows state 603 and data from user input devices 604. For example, user input associated with windows 605 is derived by associating each keyboard input with the foreground window as determined by data about windows state 603.

User input associated with processes 606 may be derived by combining data about windows association with processes 602 and user input associated with windows 605. For example, user input associated with processes 606 is derived by associating each user input associated with windows 605 with the process known to be associated with the window, as determined by data about windows association with processes 602.

Aggregate data about processes 607 is a combination of all directly collected data about process usage of resources 601 together with all indirectly derived data (e.g., user input associated with processes 606).

More measured or derived data 699 refers to the infinite possibilities for data collection and combinations. More measured or derived data 699 includes all data directly obtainable from Monitored Environment 100. It is noted that Categorization System 200 may choose the data items that are of interest.

Figure 4:
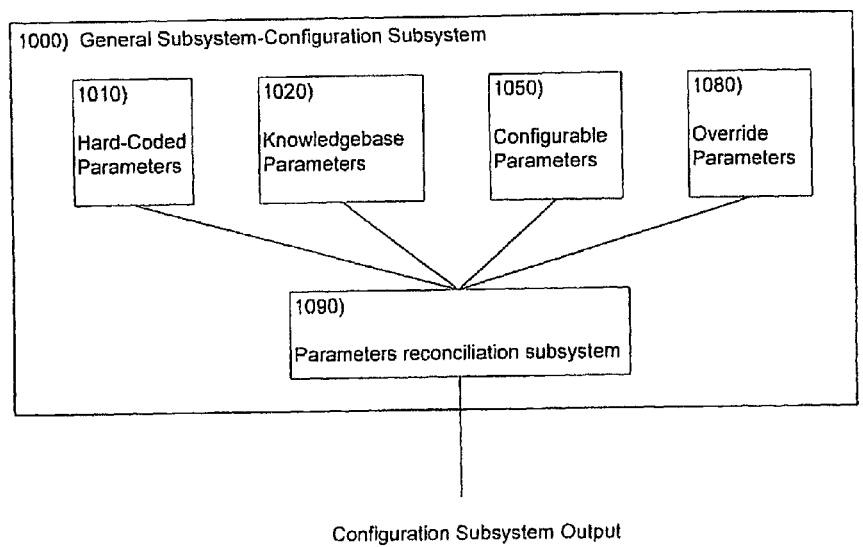
FIG. 4 is a schematic illustration of a General Subsystem-Configuration Subsystem which may be used by each of the subsystems in categorization system of FIG. 1.

Reference is now made to FIG. 4, which is a schematic illustration of a General Subsystem-Configuration Subsystem 1000, which may be used by any and all of the subsystems in Categorization System 200 of FIG. 1. This subsystem controls the behavior of other modules by specifying parameters such as thresholds, factors, limits, and the like, and is a common technique readily recognizable by persons skilled in the art.

Hard-Coded parameters 1010 are behaviors of the configured subsystem or module, which are part of its inherent architecture, either by hardware, software, constant data and the like. Such parameters are expected to be constant for a given version of a given embodiment. These parameters may serve a default values that may be changed by 1020, 1050 or 1080 discussed below.

Knowledgebase Parameters 1020 are behaviors of the configured subsystem or module, which may be determined by a database of parameters which may be installed together with a software embodiment of the invention. The knowledgebase database may also be updated from outside, for example, in a software embodiment of the invention, from the Internet. Some of the module's parameters may be changed by 1020, while others may be inaccessible to 1050, and therefore controlled only by 1010, 1050 and 1080.

Configurable Parameters 1050 are behaviors of the configured subsystem or module, which may be changed by the user or administrator of an embodiment, to match particular needs of a particular organization. Such configuration may be achieved by activating or deactivating modules, by changing routing of control and data within configurability limitations predetermined by the embodiment's architecture, and by specifying parameters in editable parameter lists. Some of the module's parameters may be changed by 1050, while others may be inaccessible to 1050, and therefore controlled only by 1010, 1020 and 1080.

Override Parameters 1080 are behaviors of the configured subsystem or module, which may be easily changed by a user to match the user's needs at a particular time. Such configuration may be achieved by the embodiment's user interface. Some of the module's parameters may be changed by 1080, while others may be inaccessible to 1080, and therefore controlled only by 1010, 1020 and 1050.

Parameters Reconciliation subsystem 1090 accepts parameters from 1010, 102, 1050 and 1080 and provides the controlled module with a single set of parameters. In case of disagreement between parameters specified by different inputs, Parameters Reconciliation subsystem 1090 may give one input precedence over another. For example, in the preferred embodiment, Override Parameters 1080 has precedence over Configurable Parameters 1050, Configurable Parameters 1050 has precedence over Knowledgebase Parameters 1020, and Knowledgebase Parameters 1020 has precedence over Hard-Coded Parameters 1010. Alternatively, Parameters Reconciliation subsystem 1090 may inform the user of the parameter disagreement, and let the user decide which parameters to use.

Hard-Coded parameters 1010 is coupled with Parameters Reconciliation subsystem 1090; Configurable Parameters1050 is coupled with Parameters Reconciliation subsystem 1090; Knowledgebase Parameters 1020 is coupled with Parameters Reconciliation subsystem 1090; and Override Parameters 1080 is coupled with Parameters Reconciliation subsystem 1090. Parameters Reconciliation subsystem 1090 provides parameters to the module controlled by General Subsystem-Configuration Subsystem.

Figure 5:
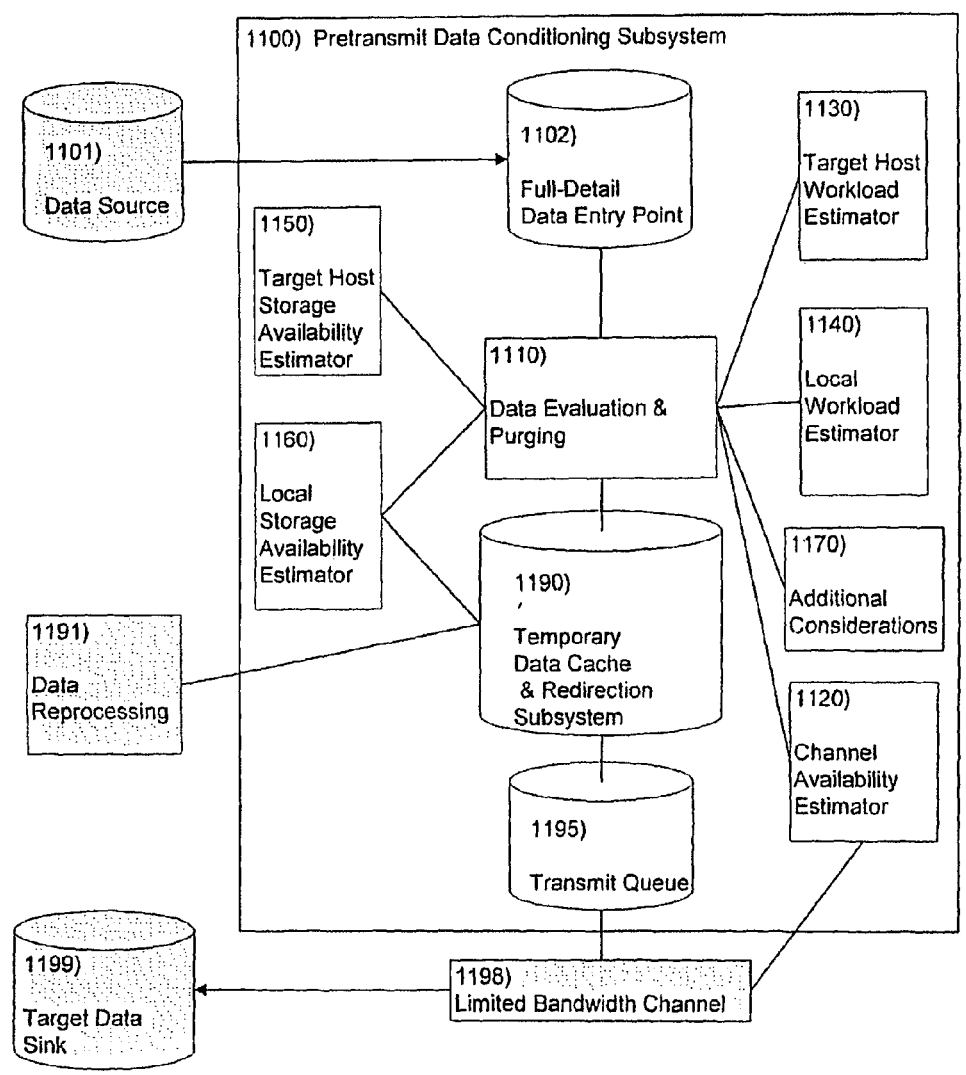
FIG. 5 is a schematic illustration of a Pretransmit Data Conditioning Subsystem which may be used before transferring data over a limited-bandwidth channel between any connected subsystems in categorization system of FIG. 1.

Reference is now made to FIG. 5, which is a schematic illustration of a Pretransmit Data Conditioning Subsystem 1100, which may be used before transferring data over a limited-bandwidth channel between any and all connected subsystems in Categorization System 200 of FIG. 1. Data Source 1101 may be any component of Categorization System 200, which generates data. Target Data Sink 1199 may be any component of Categorization System 200, which accepts data. Data Reprocessing 1191 may be part of any component of Categorization System 200, which is capable of performing data processing. For example, Primary Analysis Subsystem 300 of FIG. 1 may use a Pretransmit Data Conditioning Subsystem 1100 to reduce the amount of data in order to enable the data to fit inside Storage Subsystem 203. In this case, Data Source 1101 is Primary Analysis Subsystem 300 of FIG. 1; Target Data Sink 1199 is Storage Subsystem 203 of FIG. 1; and Data Reprocessing 1191 may be part of Primary Analysis Subsystem 300 which is capable of performing additional data processing on the data in Data Cache & Redirection Subsystem 1190. Some or all of Data Reprocessing 1191 may be an internal part of Pretransmit Data Conditioning Subsystem 1100.

Full Detail Entry Point 1102 accepts the unconditioned data from Data Source 1101. In the example stated above, Full Detail Entry Point 1102 accepts all data generated by Primary Analysis Subsystem 300.

Data Evaluation & Purging 1110 uses information from Channel Availability Estimator 1120, from Local Workload Estimator 1140, from Target Host Workload Estimator 1130, from Local Storage Availability Estimator 1160, from Target Host Storage Availability Estimator 1150 and from Additional Considerations 1170 to make decisions regarding data coming from 1102, and regarding data already residing in Temporary Data Cache & Redirection Subsystem 1190.

Pretransmit Data Conditioning Subsystem 1100 takes data and attempts to transmit it over a Limited Bandwidth Channel 1198. Depending on availability of local, intermediate and target resources, Pretransmit Data Conditioning Subsystem 1100 may decide to Purge some of the data, to save some data for future transmission, and/or to make some of the data available for further processing by Data Reprocessing 1191, which may reduce the size of the data to be transmitted, and may save eventual processing at the target.

Full-Detail Data Entry Point 1102 may be a storage or a module transferring data from outside Pretransmit Data Conditioning Subsystem 1100. Full-Detail Data Entry Point 1102 may be the partly or wholly combined with Temporary Data Cache & Redirection Subsystem 1190. Data Evaluation & Purging 1110 may evaluate the incoming data, may arrange the data into Data-Nuggets, each may include a Data part and a Tag part. The Data part of a Data nugget may contain data taken from Full-Detail Data Entry Point 1102. The Tag part of the Data-Nugget may contain key information that can help associate the Tag with the Data part, if the Tag and Data parts are stored separately. The Tag may also contain Thinning Parameters such as importance, urgency, time-of-arrival, Relevance Timeframe, References to other Data-Nuggets, etc.

Data Evaluation & Purging 1110 decides which Data-Nuggets may be purged due to a low importance/channel-availability ratio. Data Evaluation & Purging 1110 may use information from Channel Availability Estimator 1120 to limit the amount of information transmitted over the Limited Bandwidth Channel 1198. Data Evaluation & Purging 1110 may also use information from Local Workload Estimator 1140 to decide to pass a Data-Nugget or a group of Data-Nuggets through some extra analysis, consuming local processing power, and reducing the size of the Data to be transmitted, therefore saving Channel Bandwidth. Data Evaluation & Purging 1110 may also use information from Target Host Workload Estimator 1130 to decide whether to perform extra analysis locally even if the Channel Availability is high, to save processing time on the target host. Data Evaluation & Purging 1110 may reevaluate the same Data-Nugget any number of times over the course of the Data-Nugget's life. Each time the Data-Nugget is evaluated, Data Evaluation & Purging 1110 may decide it is still important enough to keep, but not important enough to transmit. Ultimately, Data Evaluation & Purging 1110 may decide either to transmit the Data-Nugget, or to purge it. For as long as the Data-Nugget is to be kept—it is kept in Temporary Data Cache & Redirection Subsystem 1190. Data Evaluation & Purging 1110 may read the whole Data-Nugget from Temporary Data Cache & Redirection Subsystem 1190 for every reevaluation. Alternatively, Data Evaluation & Purging 1110 has read-access in Temporary Data Cache & Redirection Subsystem 1190 only to the Tag of the Data-Nugget, allowing Data Evaluation & Purging 1110 to evaluate the Tag as a basis for its decision. In some embodiments, Data Evaluation & Purging 1110 may dynamically change the Tag-data—for example, extend the relevance timeframe if Channel Availability Estimator 1120 projects the channel may become more available than predicted before. In some embodiments, Data Evaluation & Purging 1110 may dynamically change the Data part of the Data-Nugget on Temporary Data Cache & Redirection Subsystem 1190, for example, breaking a large Data-Nugget into two or more, with different importance. Data Evaluation & Purging 1110 may reevaluate cached data periodically. In addition, Data Evaluation & Purging 1110 may reevaluate cached data upon being informed of a change by Channel Availability Estimator 1120. For example, if the channel has become more available. In addition, Data Evaluation & Purging 1110 may reevaluate cached data upon being informed of a change by Local Workload Estimator 1140. For example, if Local Workload has decreased, some large partly-analyzed Data-Nugget in Temporary Data Cache & Redirection Subsystem 1190 may be retrieved for local analysis by Data Reprocessing 1191, which would reduce its size. Data Evaluation & Purging 1110 may use information from Local Storage Availability Estimator 1160 and from Target Host Storage Availability Estimator 1150, to make alter its decisions regarding purging, keeping or reprocessing data in Temporary Data Cache & Redirection Subsystem 1190.

Additional Considerations 1170 may also affect decisions by Data Evaluation & Purging 1110. Such considerations may include configuration information such as General Subsystem-Configuration Subsystem 1000 of FIG. 4.

Data-Nugget scheduled for transmission are placed in Transmit Queue 1195 for transmission to Target Data Sink 1999 through Limited Bandwidth Channel 1198. Transmit Queue 1195 may be part of Temporary Data Cache & Redirection Subsystem 1190 or a separate subsystem. Transmit Queue 1195 may be internally in Pretransmit Data Conditioning Subsystem 1100 or outside of it. Transmit Queue 1195 may be any type of storage system such as RAM, or any type of communication system such as a LAN card with software drivers.

Limited Bandwidth Channel 1198 may be any communication medium such as a LAN—either wired or wireless, an Internet connection, a dedicated connection such as RS232, and the like. Limited Bandwidth Channel 1198 may also be any connection to a storage device, such as a computer bus, and the like. Limited Bandwidth Channel 1198 may also be any other type of connection between two or more components among which data is to be transferred. Limited Bandwidth Channel 1198 may be a single such connection, or an aggregate of connections used serially, in parallel, or in a combination of serial and parallel connections.

Figure 6:
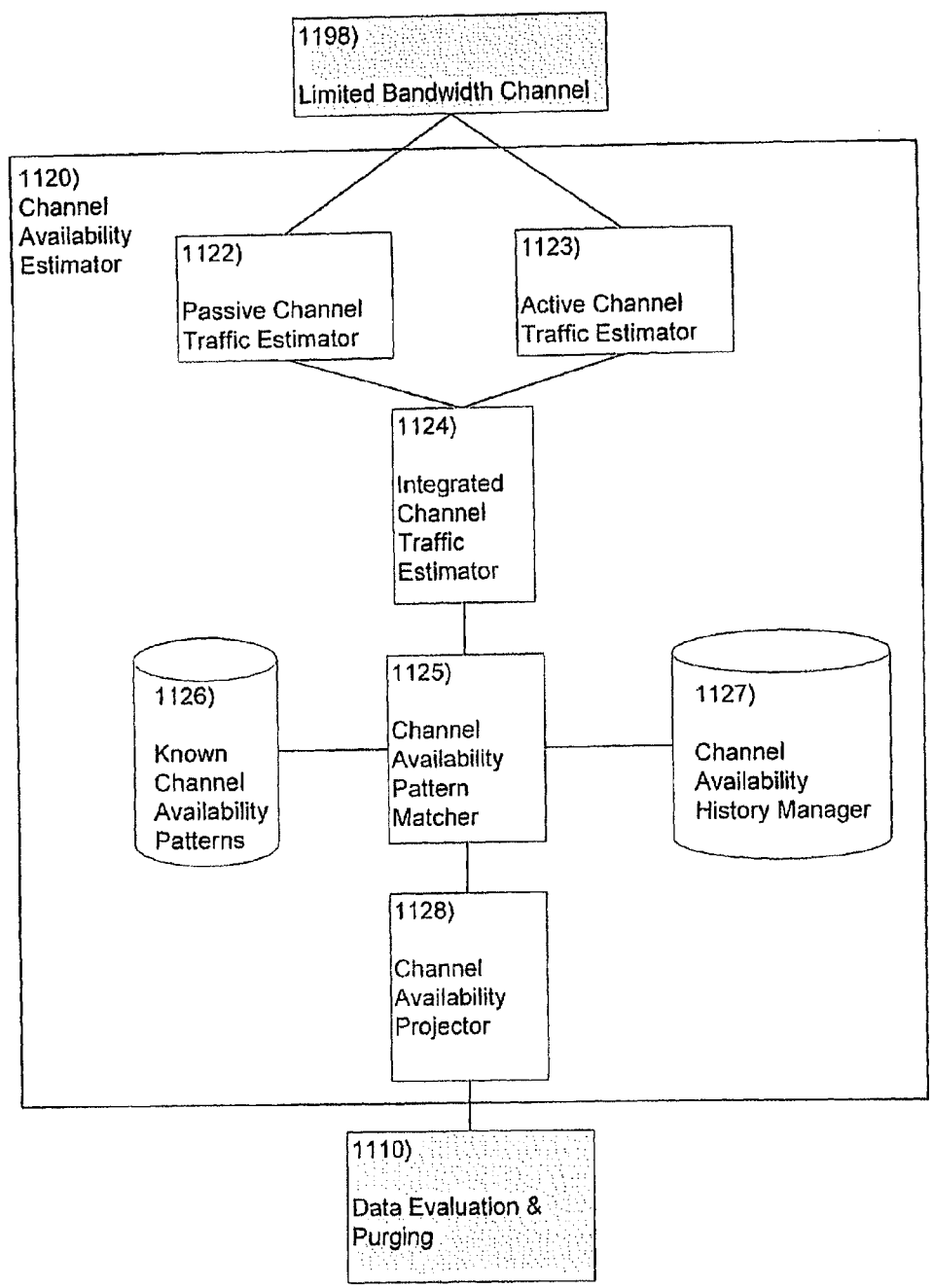
FIG. 6 is a schematic illustration of a Channel Availability Estimator which may be used to enable decisions within a Pretransmit Data Conditioning Subsystem, such as illustrated in FIG. 5.

Reference is now made to FIG. 6, which is a schematic illustration of a Channel Availability Estimator 1120 which may be used in a Pretransmit Data Conditioning Subsystem 1100 of FIG. 5. Channel Availability Estimator 1120 may use any number of Passive Channel Traffic Estimator 1122, for example, using the local LAN adapter to "sniff" LAN activity and determine how busy the LAN is. In addition, Channel Availability Estimator 1120 may use any number of Active Channel Traffic Estimator 1123, for example, sending TCP/IP "ping" packets to certain network locations, and by measuring the time it takes for the "ping" transaction to complete, estimate the network availability level, where short time would indicate high availability and long time or ping packet-loss would indicate low availability. The output of Passive Channel Traffic Estimator 1122 and Active Channel Traffic Estimator 1123 may be integrated in Integrated Channel Traffic Estimator 1124, which builds a set of Traffic Estimation Indices, such as Estimated Channel Busy Percentage, which is the percentage of time the channel is in use by any device. Current traffic data from Integrated Channel Traffic Estimator 1124 may be fed into Channel Availability Pattern Matcher 1125, which may use the new data together with historical data recorded in Channel Availability History 1127, and may match the data with channel availability patterns found in Known Channel Availability Patterns storage unit 1126. Channel Availability Pattern Matcher 1125 may also update Channel Availability History Manager 1127 with the new data from Integrated Channel Traffic Estimator 1124, so in the next cycle of pattern-matching, all the old and new data can be evaluated by Channel Availability Pattern Matcher 1125. Channel Availability History Manager 1127 may purge irrelevant data to avoid consuming more resources than deemed necessary. For example, Channel Availability History Manager 1127 may purge all information that is more than 1 week old.

Channel Availability Pattern Matcher 1125 may estimate the extent of the match between channel availability information from Channel Availability History Manager 1127 and known patterns from Known Channel Availability Patterns storage unit 1126, for example, such match estimates may be done by a simple correlation of the actual channel availability over the last 5 minutes with 5 minutes of a known pattern from Known Channel Availability Patterns storage unit 1126.

The types and level of correlation of patterns matched may be passed from Channel Availability Pattern Matcher 1125 to Channel Availability Projector 1128, together with additional information from Known Channel Availability Patterns storage unit 1126, projecting the future channel availability that matches the identified pattern. For example, if the pattern shows steady increase in channel availability over 5 minutes, the projection attached to the pattern stored in Known Channel Availability Patterns storage unit 1126 may be that channel availability will continue to increase for another 1 minute. Information stored in Known Channel Availability Patterns storage unit 1126 and Channel Availability History Manager 1127 may include time information such as hour-of-the-day, day-of-week, etc., to increase the accuracy of pattern matches.

The output of Channel Availability Projector 1128 is used as input to Data Evaluation & Purging 1110 of FIG. 5. Passive Channel Traffic Estimator 1122 and Active Channel Traffic Estimator 1123 collect information about Limited Bandwidth Channel of FIG. 5.

Figure 7:
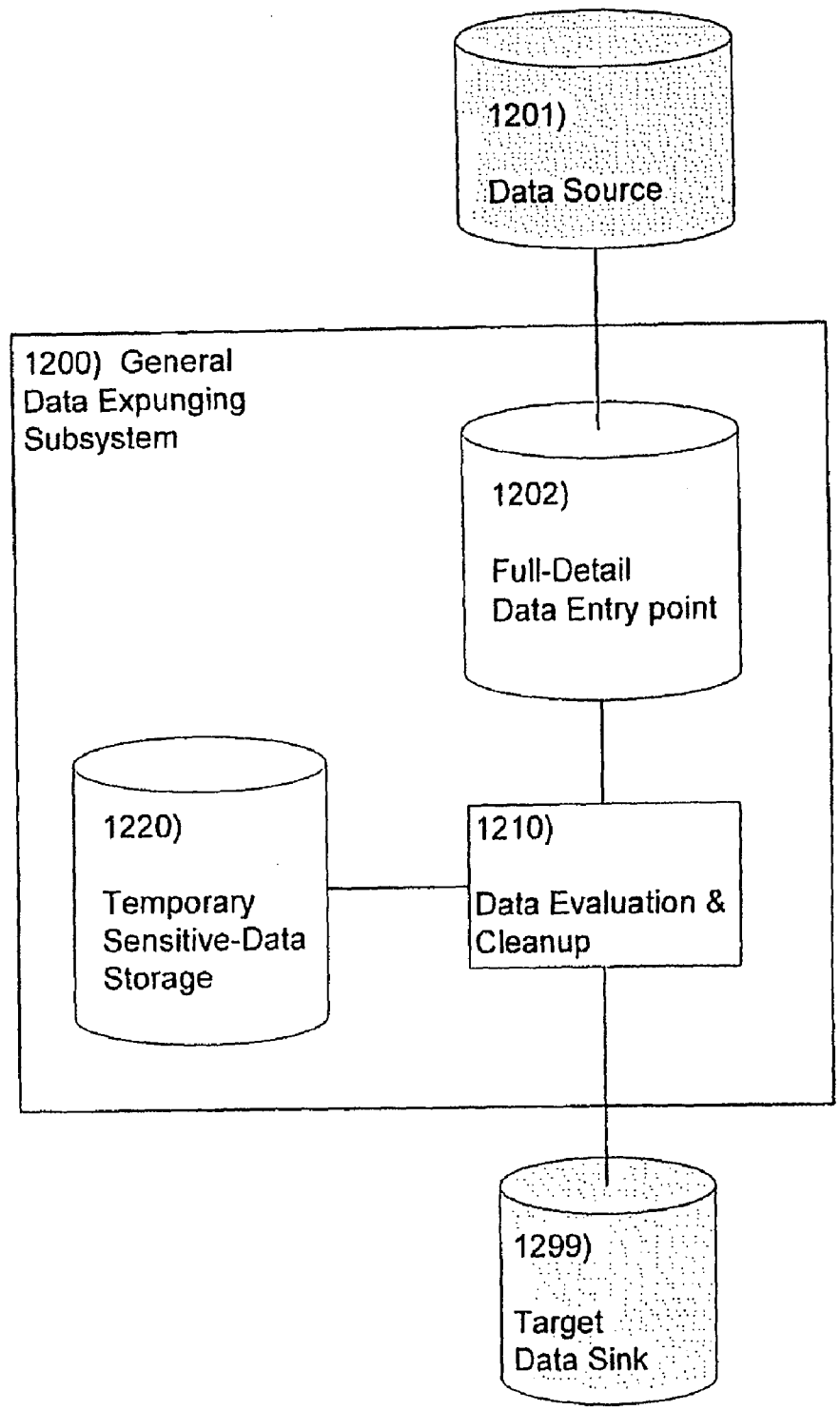
FIG. 7 is a schematic illustration of a General Data Expunging Subsystem, which may be used to ensure privacy and data security by eliminating some of the data at different points within categorization system of FIG. 1.

Reference is now being made to FIG. 7, which is a schematic illustration of a General Data Expunging Subsystem 1200, which may be used to ensure privacy and data security by eliminating some of the data at different points between any and all components of Categorization System 200 of FIG. 1. For example, General Data Expunging Subsystem 1200 may be used to eliminate specific keyboard typing information by Measurement Subsystem 201, and analyzed by Primary Analysis Subsystem 300 before being put in Storage Subsystem 203. This will prevent a privacy breach due to the exposure of a text typed by a user, while still allowing the Categorization System 200 to generate statistical data based on the keyboard typing. In this case Data Source 1201 of FIG. 7 will be the a part of Primary Analysis Subsystem 300 of FIG. 1, and Target Data Sink 1299 of FIG. 7 will be the a part of Storage Subsystem 203 of FIG. 1.

Data Evaluation & Cleanup 1210 is coupled with Full-Detail Data Entry Point 1202, with Temporary Sensitive-Data Storage 1220 and with Target Sink 1299.

Data arriving at Full-Detail Data Entry Point 1202 may be already tagged with context-data, allowing better cleanup. Context-data may be data-source, associated measurements, and the like.

Data in Temporary Sensitive-Data Storage 1220 may be protected from unauthorized access by being volatile and/or by encryption. Temporary Sensitive-Data Storage 1220encryption may be generated by the Categorization System 200 or by any component thereof, and may be known only inside the Categorization System 200 or its components.

Reference is now being made to FIG. 8, which is a schematic illustration of a Primary Analysis Subsystem, generally referenced 300, which is a part of the Categorization System 200 of FIG. 1.

UI (User Interface) Conditions Over Time Modeling Subsystem 320 receives raw data from outside Primary Analysis Subsystem 300. UI Conditions Over Time Modeling Subsystem 320 is coupled with Condition Model Integration Subsystem 350. UI Conditions Over Time Modeling Subsystem 320 may consider any activities from User Input Devices 107 of FIG. 2, user Output Devices 108 of FIG. 2, Sensors 109 of FIG. 2 that may be relevant to the user, Actuators 110 of FIG. 2 that may be relevant to the user, Windows 104 of FIG. 2 that may be relevant to the user, and any other measurement that may be relevant to the user. In the preferred embodiment, UI Conditions Over Time Modeling Subsystem 320 will consider keyboard usage parameters such as the following:

```
Duration/strength of key-press
Detect keyboard errors by detecting back-space, arrows, retype
Switching between KB & Mouse
Usage histogram of KB keys
Time it takes to switch from/to each key. Possibly all combinations
Typing speed
Rests - how-often + how-long
```

In the preferred embodiment, UI Conditions Over Time Modeling Subsystem 320 will also consider pointing device usage parameters from a mouse, and any other relevant info from similar pointing devices:

```
Left-click
Right-click
Double-click
Middle-click
Middle-wheel use
Mouse movement distance/speed/angles
Segmented movement, due to small workspace for mouse
Changes in speed during movement. E.g., fast at the
 beginning of the movement, slow at the end.
Dragging & dropping distance/speed
```

In the preferred embodiment, UI Conditions Over Time Modeling Subsystem 320 will also consider the parameters of other input devices. UI Conditions Over Time Modeling Subsystem 320 may also consider the parameters of output devices, such as screen/window refresh time, audio, etc. UI Conditions Over Time Modeling Subsystem 320 may generate a model of the UI condition at any point in time by aggregating User-Interface information into a simplified "Temporary-Condition". For example, if the at a certain time, the keyboard is very active, UI Conditions Over Time Modeling Subsystem 320 may designate the "Temporary-Condition" as "UI-Fast-Typing". As a further example, if overall UI activity is below a certain threshold, UI Conditions Over Time Modeling Subsystem 320 may designate the "Temporary-Condition" as "UI-Unused". UI Conditions Over Time Modeling Subsystem 320 may generate a model of the UI condition in two or more instances together. For example, if at time 09:00:00-09:01:00 the "Temporary-Condition" was "UI-Fast-Typing", and at time 09:01:00-09:02:00 the "Temporary-Condition" was "UI-Unused", and at time 09:02:00-09:03:00 the "Temporary-Condition" was "UI-Fast-Typing", UI Conditions Over Time Modeling Subsystem 320 may designate the "Condition-Over-Time" as "UI-Intermittent-Fast-Typing". There may be many types of "Temporary-Condition" and "Condition-Over-Time".

HW (hardware) Conditions Over Time Modeling Subsystem 330 receives raw data from outside Primary Analysis Subsystem 300. HW Conditions Over Time Modeling Subsystem 330 is coupled with Condition Model Integration Subsystem 350. HW Conditions Over Time Modeling Subsystem 330 may consider any hardware-related information about activities from Computation Units 101 of FIG. 2, from Storage 105 of FIG. 2, from Data Communication 106 of FIG. 2, from User Input Devices 107 of FIG. 2, from User Output Devices 108 of FIG. 2, from Sensors 109 of FIG. 2, from Actuators 110 of FIG. 2, and from any other subsystem with a hardware aspect to which HW Conditions Over Time Modeling Subsystem 330 has access. In a preferred embodiment, HW Conditions Over Time Modeling Subsystem 330 will consider CPU parameters such as load and speed. In the preferred embodiment, HW Conditions Over Time Modeling Subsystem 330 will also consider memory parameters such as physical memory usage, virtual memory usage, page faults, etc. In the preferred embodiment, HW Conditions Over Time Modeling Subsystem 330 will also consider general parameters such as the number and type of input actions, and the numbers and types of output actions. HW Conditions Over Time Modeling Subsystem 330 may generate a model of the hardware condition at any point in time by aggregating hardware information into a simplified "Temporary-Condition". For example, if the at a certain time, CPU utilization is above a certain threshold, and at the same time other hardware activities are low, HW Conditions Over Time Modeling Subsystem 330 may designate the "Temporary-Condition" as "HW-CPU-Bound". As a further example, if overall hardware activity is below a certain threshold, HW Conditions Over Time Modeling Subsystem 330 may designate the "Temporary-Condition" as "HW-Unused". HW Conditions Over Time Modeling Subsystem 330 may generate a model of the hardware condition two or more instances together. For example, if at time 09:00:00-09:05:00 the "Temporary-Condition" was "HW-CPU-Bound", and at time 09:05:00-09:10:00 the "Temporary-Condition" was "HW-Unused", HW Conditions Over Time Modeling Subsystem 330 may designate the "Condition-Over-Time" as "H W-Overutil zed-And-Abandoned". There may be many types of "Temporary-Condition" and "Condition-Over-Time".

SW (Software) Condition Over Time Modeling Subsystem 340 receives raw data from outside Primary Analysis Subsystem 300. SW Conditions Over Time Modeling Subsystem 340 is coupled with Condition Model Integration Subsystem 350. SW Conditions Over Time Modeling Subsystem 340 may consider any software-related information about activities from Operating System 102 of FIG. 2, from Processes 103 of FIG. 2, from Windows 104 of FIG. 2, from Storage 105 of FIG. 2, from Data Communication 106 of FIG. 2, from User Input Devices 107 of FIG. 2, from User Output Devices 108 of FIG. 2, and from any other subsystem with a software aspect to which SW Conditions Over Time Modeling Subsystem 340 has access. SW Conditions Over Time Modeling Subsystem 340 may also consider Windows 104 of FIG. 2 parameters such as window size, location, values in specific fields, and the Window's connection to other resources, such as processes. SW Conditions Over Time Modeling Subsystem 340 may generate a model of the software condition at any point in time by aggregating software information into a simplified "Temporary-Condition". For example, if the at a certain time, CPU utilization by a certain piece of software— MSDEV.EXE—is above a certain threshold, and at the same time other software activities are low, SW Conditions Over Time Modeling Subsystem 340 may designate the "Temporary-Condition" as "SW-CPIJ-Bound:MSDEV". As a further example, if overall software activity is below a certain threshold, SW Conditions Over Time Modeling Subsystem 340 may designate the "Temporary-Condition" as "SW-Unused". SW Conditions Over Time Modeling Subsystem 340 may generate a model of the software condition two or more instances together. For example, if at time 09:00:00-09:05:00 the "Temporary-Condition" was "SW-CPU-Bound:MSDEV", and at time 09:05:00-09:10:00 the "Temporary-Condition" was "SW-Unused", SW Conditions Over Time Modeling Subsystem 340 may designate the "Condition-Over-Time" as "SW-Overutilized-And-Abandoned:MSDEV" There may be many types of "Temporary-Condition" and "Condition-Over-Time".

Condition Model Integration Subsystem 350 may use information from UI Conditions Over Time Modeling Subsystem 320; Condition Model Integration Subsystem 350 may use information from HW Conditions Over Time Modeling Subsystem 330; Condition Model Integration Subsystem 350 may use information from SW Conditions Over Time Modeling Subsystem 340. Condition Model Integration Subsystem 350 may combine "Temporary-Condition" and/or "Condition-Over-Time" from two or more of its inputs into aggregate designations of "Temporary-Condition" and "Condition-Over-Time". For example, if at time 09:00:00-09:01:00, and at time 09:02:00-09:03:00, and at time 09:04:00-09:05:00 UI Conditions Over Time Modeling Subsystem 320 reports "Temporary-Condition" of "UI-Fast-Typing", and at the same times SW Conditions Over Time Modeling Subsystem 340 reports "Temporary-Condition" as "SW-Unused"; and if at time 09:01:00-09:02:00 and at time 09:03:00-09:04:00 UI Conditions Over Time Modeling Subsystem 320 reports "Temporary-Condition" as "UI-Unused"; and at the same times SW Conditions Over Time Modeling Subsystem 340 reports "Temporary-Condition" as "SW-CPU-Bound: MSDEV". At receiving such inputs, Condition Model Integration Subsystem 350 may designate the "Condition-Over-Time" as "User-CPU-Bound:MSDEV". Condition Model Integration Subsystem 350 may add any number of parameters to its reported "Temporary-Condition" and "Condition-Over-Time". For example, in the above example, the "Condition-Over-Time" may be refined to "User-CPU-Bound: MSDEV:60 seconds:50%" indicating the average "UI-Unused" with "SW-CPU-Bound:MSDEV" time was 60 seconds and the percentage of time over the full period was 50%. "Extra" Parameters added by Condition Model Integration Subsystem 350 may include statistical parameters, heuristic matching with known conditions, parameters extracted using data-mining techniques, etc. In some cases the "Temporary-Condition" and/or "Condition-Over-Time" generated may not be certain. For example, in the above example, if the level of CPU utilization by MSDEV is above a minimal threshold (E.g., 50%) and below a higher threshold (E.g., 98%). In such a case, Condition Model Integration Subsystem 350 may assign a probability to the generated "Temporary-Condition" and/or "Condition-Over-Time". For example, "User-CPU-Bound:MSDEV, probability=70%". Condition Model Integration Subsystem 350 may report two or more designations of "Temporary-Condition" and/or "Condition-Over-Time" for the same timeframe, and each of them may have its own probability.

Some or all such extra parameters may be generated by UI Conditions Over Time Modeling Subsystem 320. Some or all such extra parameters may be generated by HW Conditions Over Time Modeling Subsystem 330. Some or all such extra parameters may be generated by SW Conditions Over Time Modeling Subsystem 340. Some or all such extra parameters may be generated by User Behavior Modeling Subsystem 360.

"Condition-Over-Time". For example, if at time 09:00:00-09:01:00, and at time 09:02:00-09:03:00, and at time 09:04:00-09:05:00 UI Conditions Over Time Modeling Subsystem 320 reports "Temporary-Condition" of "UI-Fast-Typing", and at the same times SW Conditions Over Time Modeling Subsystem 340 reports "Temporary-Condition" as "SW-Unused"; and if at time 09:01:00-09:02:00 and at time 09:03:00-09:04:00 UI Conditions Over Time Modeling Subsystem 320 reports "Temporary-Condition" as "UI-Unused"; and at the same times SW Conditions Over Time Modeling Subsystem 340 reports "Temporary-Condition" as "SW-CPU-Bound: MSDEV". At receiving such inputs, Condition Model Integration Condition Model Integration Subsystem 350 may include some or all of the functionality of UI Conditions Over Time Modeling Subsystem 320. Condition Model Integration Subsystem 350 may include some or all of the functionality of HW Conditions Over Time Modeling Subsystem 330. Condition Model Integration Subsystem 350 may include some or all of the functionality of SW Conditions Over Time Modeling Subsystem 340.

User Behavior Modeling Subsystem 360 may be a separate mechanism, a part of another mechanism such as Condition Model Integration Subsystem 350, or divided across more than one mechanism. User Behavior Modeling Subsystem 360 may add higher-level designations to "Temporary-Condition" and "Condition-Over-Time" of the User 1 of FIG. 2. User Behavior Modeling Subsystem 360 may use data from Condition Model Integration Subsystem 350. User Behavior Modeling Subsystem 360 may use historical data for the Monitored Environment 100 and User 1 of FIG. 2. User Behavior Modeling Subsystem 360 may use heuristic algorithms. For example, if at time 09:00:00-09:01:00 there was a "Temporary-Condition" of "UI-Fast-Typing", and at time 09:01:00-09:10:00 there was a "Temporary-Condition" of "HW-CPU-Bound" together with "UI-Unused", and at time 09:10:00-09:30:00 there was a "Temporary-Condition" of "HW-Unused" together with "UI-Unused", and at time 09:30:00 "UI-Unused" was stopped, then User Behavior Modeling Subsystem 360 may report "User-Left-While-HW-CPU-Bound". User Behavior Modeling Subsystem 360 may pass some or all of its input out of Primary Analysis Subsystem for further analysis, possibly eliminating Primary Analysis Data Integration Subsystem 390.

Primary Analysis Data Integration Subsystem 390 is an optional subsystem that passes some or all of the information from User Behavior Modeling Subsystem 360 and/or some or all of the information from Condition Model Integration Subsystem 350 out of Primary Analysis Subsystem for further analysis.

Some or all of the subsystems of Primary Analysis Subsystem 300 may keep and/or use historical data to alter their analysis.

Some or all of the subsystems of Primary Analysis Subsystem 300 may output less data than the amount of data they received as input, by eliminating less important data, and/or by eliminating data already used for synthesizing new data.

In some embodiments, all or parts of Primary Analysis Subsystem 300 may be located within Analysis & Reporting Subsystem 900. Primary Analysis Subsystem 300 may be coupled directly with Measurement Subsystem 201 of FIG. 1, may pass to Storage Subsystem 203 of FIG. 1 some or all of the measured data in addition to data after Primary Analysis, if any.

Figure 9:
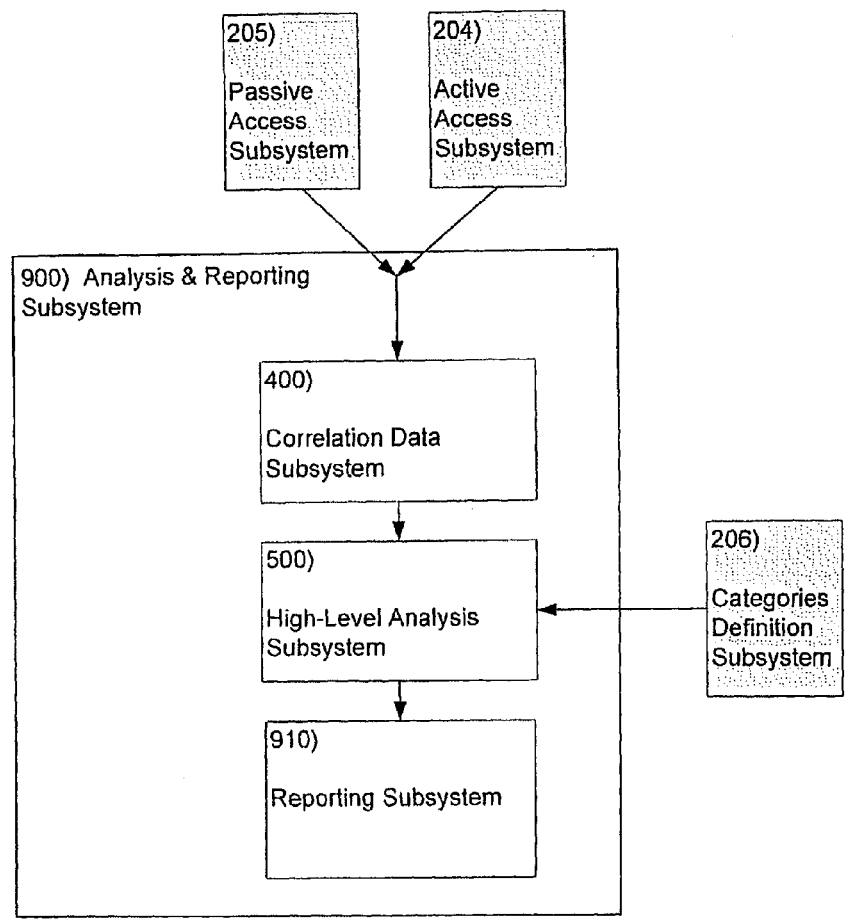
FIG. 9 is a schematic illustration of Analysis & Reporting Subsystem, which may be used to further analyze and produce reports on data within one or more categorization systems of FIG. 1.

Reference is now being made to FIG. 9, which is a schematic illustration of Analysis & Reporting Subsystem 900, which may be used to further analyze and produce reports on data within one or more Categorization Systems 200 of FIG. 1

Data arriving through Active Access Subsystem 204 of FIG. 1 or through Passive Access Subsystem 205 of FIG. 1 may be passed to Correlation Data Subsystem 400 for export to other instances of Analysis & Reporting Subsystem 900, and/or for integration with data arriving from other instances of Analysis & Reporting Subsystem 900.

Data regarding one or more instances of Categorization Systems 200 of FIG. 1 may be passed from Correlation Data Subsystem 400 to High-Level Analysis Subsystem 500.

High-Level Analysis Subsystem 500 may use data from Categorization Definition Subsystem 206 of FIG. 1. Data from High-Level Analysis Subsystem 500 may be passed to Reporting Subsystem 910.

Data from any component of Analysis & Reporting Subsystem 900 may be made available to systems external to Categorization Systems 200 of FIG. 1, such as a Human Resources management system, and the like. Data from systems external to Categorization Systems 200 of FIG. 1 may be incorporated into Analysis & Reporting Subsystem 900, and added to its analysis and/or reports.

Analysis & Reporting Subsystem 900 may use and produce reports on data from a single instance of Categorization Systems 200 of FIG. 1. Analysis & Reporting Subsystem 900 may receive data from a single instance of Categorization Systems of FIG. 1, and pass it to Correlation Data Subsystem 400 of FIG. 10. Analysis & Reporting Subsystem 900 may receive data from Correlation Data Subsystem 400 regarding one or more instances of Categorization Systems of FIG. 1, and analyze and produce reports about these data.

Correlation Data Subsystem 400 may let data pass through it with partial or no modification, from outside Analysis & Reporting Subsystem 900 to High-Level Analysis Subsystem 500. High-Level Analysis Subsystem 500 may let data pass through it with partial or no modification, from Correlation Data Subsystem 400 to Reporting Subsystem 910.

Correlation Data Subsystem 400 within Analysis & Reporting Subsystem 900 may be used as a link to other instances of Analysis & Reporting Subsystem 900, and through them, to other instances of Categorization System 200 of FIG. 1. In some instances of Analysis & Reporting Subsystem 900, Correlation Data Subsystem 400 is used as the only sink to data entering Analysis & Reporting Subsystem 900, and it may be that no analysis or reporting is produced by that instance of Analysis & Reporting Subsystem 900. In some instances of Analysis & Reporting Subsystem 900, Correlation Data Subsystem 400 may be the only source of data, and Analysis & Reporting Subsystem 900 may be disconnected from any external source such as Active Access Subsystem 204 of FIG. 1 or Passive Access Subsystem 205 of FIG. 1, or data from Correlation Data Subsystem 400 may be ignored; in such a case, Analysis & Reporting Subsystem 900 may function as a reporting-only system, without its own Monitored Environment 100.

High-Level Analysis Subsystem 500 within Analysis & Reporting Subsystem 900 may be used to analyze incoming data before passing the data on to Reporting Subsystem 910. High-Level Analysis Subsystem 500 may perform any type of analysis performed by Primary Analysis Subsystem 300 of FIG. 8. High-Level Analysis Subsystem 500 may be an additional instance of Primary Analysis Subsystem 300, or—if Primary Analysis Subsystem 300 only passed data untouched from its input to its output—High-Level Analysis Subsystem 500 may be the only instance of Primary Analysis Subsystem 300. High-Level Analysis Subsystem 500 may make use of data from different instances of Monitored Environment 100, which may have been integrated and may have been synchronized by Correlation Data Subsystem 400. Using correlated data from multiple instances of Monitored Environment 100 may allow High-Level Analysis Subsystem 500 to create "Conditions Over Time" Models similar to those which may exist within Primary Analysis Subsystem 300, but on a higher level, and as a result, High-Level Analysis Subsystem 500 may create a User Behavior Model on a higher level. For example, using the same terms as in the discussion of FIG. 8, consider a High-Level Analysis Subsystem 500 that receives data from two instances of Monitored Environment 100— referenced 100A and 100B—which were integrated and time-synchronized by Correlation Data Subsystem 400: if at time 09:00:00-09:05:00 Monitored Environment 100A reported "Condition-Over-Time" of "UI-Used" while Monitored Environment 100B reported "Condition-Over-Time" of "UI-Unused", and at time 09:05:00-09:10:00 Monitored Environment 100B reported "Condition-Over-Time" of "UI-Used" while Monitored Environment 100A reported "Condition-Over-Time" of "UI-Unused", and such pattern of mutually exclusive use of UI is detected by High-Level Analysis Subsystem 500 for a period of time exceeding a certain threshold, High-Level Analysis Subsystem 500 may report that Monitored Environment 100A and 100B are used by the same User 1 of FIG. 2, with a high level of probability. High-Level Analysis Subsystem 500 may pass all the data it received to its output, where third party tools may perform analysis on it. High-Level Analysis Subsystem 500 may pass to its output more data or less data than it received.

Reporting Subsystem 910 may allow access to the results of all preceding analysis to users and/or automated mechanisms. Reporting Subsystem 910 may export some or all the data it receives to any number of general-purpose databases, such as Oracle, for subsequent querying. Reporting Subsystem 910 may export some or all the data to specific-purpose systems, such as Business-Intelligence systems, which may integrate the data with their sources and may perform additional analysis and/or reporting. Reporting Subsystem 910 may directly produce reports as tables, graphs and the like. Reporting Subsystem 910 may export reports and/or raw data to any system and through any means of communication and/or distribution. Reporting Subsystem 910 may either place its output where it may be "pulled" by users or automated mechanisms, or it may actively "push" its output, for example by email. Reporting Subsystem 910 may produce a report of "Missing Pieces". "Missing pieces" will be defined herein as information needed by Analysis & Reporting Subsystem 900 and/or Primary Analysis Subsystem 300, e.g., the category relevant to a specific meeting which insufficient details were imported from Microsoft-Outlook by Imported External Entity Representation Module 430 of FIG. 10. Some or all of the functionality of Reporting Subsystem 910 may be implemented within High-Level Analysis Subsystem 500.

Figure 10:
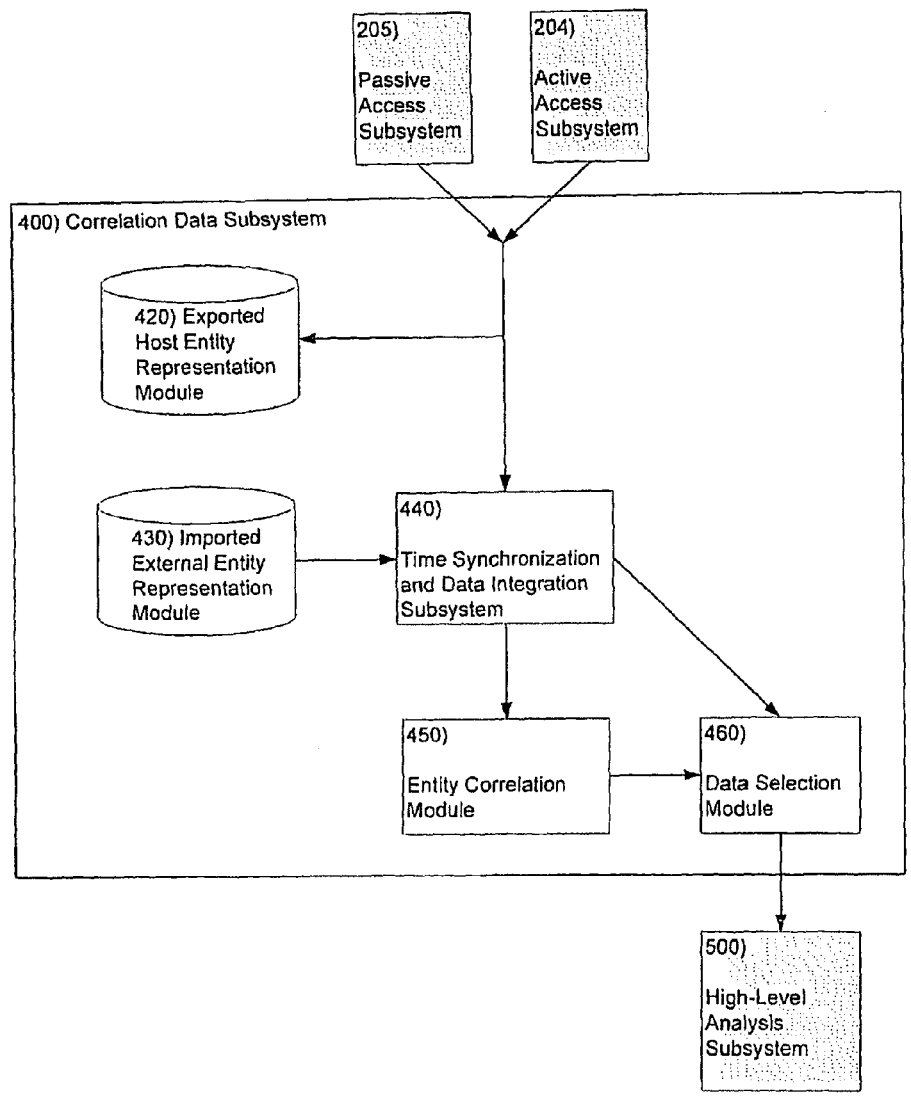
FIG. 10 is a schematic illustration of Correlation Data Subsystem, which may be used to correlate data from different Categorization Systems of FIG. 1, to facilitate and increase the scope of Analysis & Reporting Subsystem of FIG. 9.

Reference is now being made to FIG. 10, which is a schematic illustration of Correlation Data Subsystem, generally referenced 400, which may be used to correlate data from different Categorization Systems of FIG. 1, to facilitate and increase the scope of Analysis & Reporting Subsystem 900 of FIG. 9;

Exported Host Entity Representation Module 420 may receive information that enters Analysis & Reporting Subsystem 900 of FIG. 9. Exported Host Entity Representation Module 420 may reorganize the data for exporting, for example by compression. Exported Host Entity Representation Module 420 may forward some or all of the data to one or more other instances of Correlation Data Subsystem 400.

Imported External Entity Representation Module 430 may be combined with Exported Host Entity Representation Module 420. Imported External Entity Representation Module 430 may receive data from one or more other instances of Correlation Data Subsystem 400. Imported External Entity Representation Module 430 may reorganize the imported data for easier processing, for example by decompression. Imported External Entity Representation Module 430 may pass some or all the data it receives to Time Synchronization and Data Integration Subsystem 440 for processing. Imported External Entity Representation Module 430 may receive data from any general-purpose databases, such as Oracle, or from any specific-purpose system, such as an accounting software, for subsequent integration with data from instances of Monitored Environment 100; for example, data about the salary of employees may be integrated by Time Synchronization and Data Integration Subsystem 440 with data about time such employees spend waiting while HW Conditions Over Time Modeling Subsystem 330 of FIG. 8 reports "Temporary-Condition" of "HW-CPU-Bound"; High-Level Analysis Subsystem 500 of FIG. 9 will then be able to quantify the waste in financial terms, which will allow Reporting Subsystem 910 of FIG. 9 to present a useful report. Some of the data received by Imported External Entity Representation Module 430 may have been generated in response to a "Missing Pieces" report by Reporting Subsystem 910 of FIG. 9.

Time Synchronization and Data Integration Subsystem 440 may receive information that enters Analysis & Reporting Subsystem 900 of FIG. 9. Time Synchronization and Data Integration Subsystem 440 may perform the time-synchronization between different imported external entities and between such imported entities and Host entity, allowing subsequent analysis of events and activities occurring at the same time or at related times in separate instances of Monitored Environment 100 of FIG. 2.

Time Synchronization and Data Integration Subsystem 440 may use time information, which may have been added to the measurements by Measurement Subsystem 201 of FIG. 1, or by any other subsystem of Categorization System 200. Time Synchronization and Data Integration Subsystem 440 may use time information, which may have been directly measured by Measurement Subsystem 201 of FIG. 1. Time Synchronization and Data Integration Subsystem 440 may keep track of time differences between different imported external entities and between such imported entities and Host entity. For example, time differences may be deduced from the global time-zone reported by the Operating System 102 of FIG. 2. Time differences may be specified by an instance of General Subsystem-Configuration Subsystem 1000 of FIG. 4. Time differences may be directly measured by Time Synchronization and Data Integration Subsystem 440 or any other subsystem of Categorization System 200, which may compare its own host time with any source of "objective" time, such as an Internet clock—E.g., http://nist.time.gov. Time Synchronization and Data Integration Subsystem 440 may integrate data from different sources into a single stream, which may be synchronized in time. Some or all of the activities described for Time Synchronization and Data Integration Subsystem 440 may be done by Entity Correlation Module 450.

Entity Correlation Module 450 may try to find correlations between events and states of different instances of Monitored Environment 100—either Imported or measured on the Host. Entity Correlation Module 450 may use heuristic algorithms to look for such correlations. For example, if a certain instance of Monitored Environment 100 reports elevated network activity, Entity Correlation Module 450 may search for another instance of Monitored Environment 100 reporting difficulty accessing the network around the same time. Entity Correlation Module 450 may use any data-mining or other algorithm known in the art in order to find correlations. Entity Correlation Module 450 may be implemented as part of High-Level Analysis 500. Entity Correlation Module 450 may pass all the information from its input to its output unaltered.

Data Selection Module 460 may pass some or all of the data it receives from Time Synchronization and Data Integration Subsystem 440 forward for further analysis. Data Selection Module 460 may pass some or all of the data it receives from Entity Correlation Module 450 forward for further analysis.

It will be appreciated by persons skilled in the art that the invention is not limited to what has been particularly shown and described hereinabove. Rather the scope of the invention is defined only by the claims, which follow.

What is claimed is:

1. An analysis and reporting subsystem for analyzing and reporting activities in at least one monitored environment, the analysis and reporting subsystem operating on a computer and comprising:
    a correlation data subsystem to receive activity data from a respective monitored environment, and to export data to a high-level analysis subsystem, said activity data comprising information regarding conditions in the monitored environment representing user activities in the monitored environment, said correlation data subsystem comprising:
    an imported external entity representation module to receive data from at least one other monitored environment and to forward said received data to time synchronization and data integration subsystem, and
    time synchronization and data integration subsystem to integrate and synchronize in time data received from said imported external entity representation module with said activity data from said respective monitored environment;
    a high-level analysis subsystem to receive input from said correlation data subsystem and to analyze said received input to obtain a model for user behavior related to user activities in the monitored environments; and
    a reporting subsystem to report results of said analysis to enable quantification of waste in financial terms for managing performance of resources.

2. The system of claim 1 wherein said correlation data subsystem further comprises:
    an entity correlation module to receive input from said time synchronization and data integration subsystem and to identify correlation between said time, said data and said activities.

3. The analysis and reporting subsystem of claim 1 further adapted to accept data from two or more monitored environments.

4. The analysis and reporting subsystem of claim 1, further adapted to exchange data with categories definition subsystem, said categories definition subsystem is adapted to provide input to said analysis and reporting subsystem and to facilitate categorization of activities into groups, wherein said categories definition subsystem is modifiable by said analysis and reporting subsystem.

5. The system of claim 1, wherein said reporting subsystem is adapted to identify and report missing pieces of information in received data.

6. A method for analyzing and reporting activities in at least one monitored environment comprising:
    receiving data from a monitored environment at a correlation data subsystem operating on a computer, said data comprising information regarding conditions in the monitored environment representing user activities in the monitored environment;
    receiving data from another monitored environment by an imported external entity representation module operating on a computer;
    integrating and synchronizing in time, by a time synchronization and data integration subsystem operating on a computer, data received from said monitored environment with data received from said other monitored environment; and
    analyzing said synchronized data by a high-level analysis subsystem operating on a computer to obtain a model of user behavior related to user activities in the monitored environments and reporting results of the analysis to enable quantification of waste in financial terms for managing performance of resources.

7. The method of claim 6 further comprising receiving categories definitions of user activities from a categories definition subsystem, wherein said categories definition subsystem is modifiable in response to said model.

8. The method of claim 6 wherein said step of reporting comprises at least reporting of missing pieces of information in received data.

9. The method of claim 6, wherein said received data comprises user interface conditions and at least one of designations of hardware conditions and designations of software conditions.

* * * * *